(No Model.)
C. F. BRUSH.
SECONDARY BATTERY.
No. 260,654. Patented July 4, 1882.
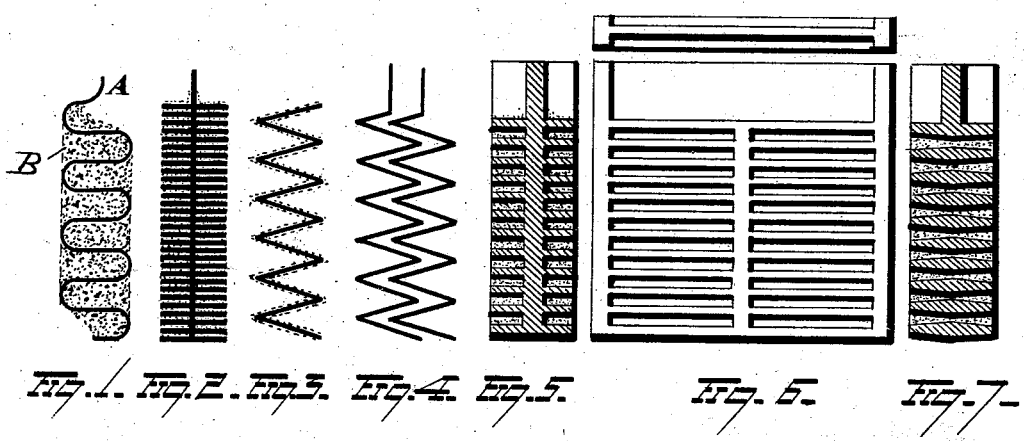
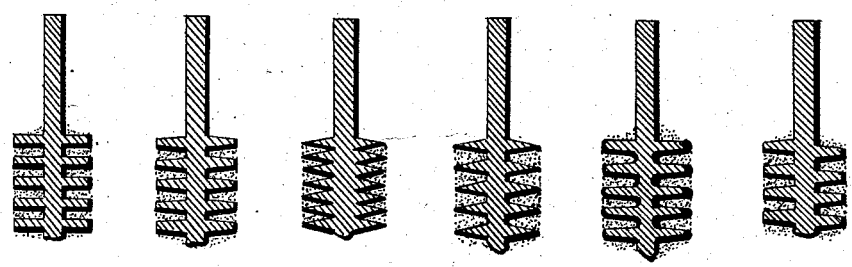
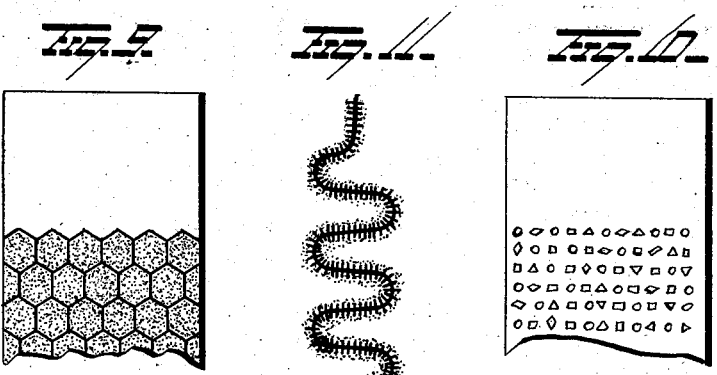
WITNESSES
INVENTOR
Charles F. Brush
By Leggett & Leggett
Attorneys

UNITED STATES PATENT OFFICE.

CHARLES F. BRUSH, OF CLEVELAND, OHIO.

SECONDARY BATTERY.

SPECIFICATION forming part of Letters Patent No. 260,654, dated July 4, 1882.

Application filed June 15, 1882. (No model.)

*To all whom it may concern:*

Be it known that I, CHARLES F. BRUSH, of Cleveland, in the county of Cuyahoga and State of Ohio, have invented certain new and useful Improvements in Secondary Batteries; and I do hereby declare the following to be a full, clear, and exact description of the invention, such as will enable others skilled in the art to which it pertains to make and use the same.

My invention relates to an improvement in secondary batteries; and it consists in the method of making the plates of a secondary battery, consisting in forming receptacles for oxide of lead in its surface, then applying oxide of lead to the plate and within such receptacles, and afterward subjecting the oxide of lead to pressure.

In the accompanying drawings, Figure 1 is an edge view of a corrugated plate having oxide of lead placed in its grooves or receptacles. Fig. 2 is a ribbed plate provided with a coating of oxide of lead. Fig. 3 is an angularly-corrugated plate. Fig. 4 shows two angularly-corrugated plates with their folds entering each other. Figs. 5 and 6 represent edge and plan and top views of a ribbed plate. Fig. 7 is a vertical section of a perforated or slotted plate. Fig. 8 shows different forms of ribbed plates. Fig. 9 is a honeycombed plate. Fig. 10 is a studded plate, and Fig. 11 is a ribbed corrugated plate.

A is a plate of lead or other suitable metal, coated with oxide of lead B, as represented by dots.

The oxide of lead may be retained in place by being rammed or pressed into its receptacles or the cells or grooves of the plates.

Peroxide is the best oxide of lead to use in the preparation of the plates; but as this is rather expensive to prepare red lead or minium may be used. Some sulphate of lead is liable to be formed when this oxide of lead is employed by the action of the sulphuric acid of the battery on it before peroxidation or reduction is effected. Monoxide of lead or litharge may also be used, but is objectionable on account of the large quantity of sulphate of lead which is unavoidably produced by the action of the acid on it.

When a pair of such plates as I have described are associated together to form a secondary battery, and immersed in dilute sulphuric acid and charged by the passage of an electric current in the usual manner, one of the plates has its coating peroxidized, if a lower oxide of lead was employed for the coating, and forms the oxygen element of the battery, while the other plate has its coating of oxide reduced to the metallic state, (slowly and imperfectly if protoxide of lead has been used for the coating,) and then absorbs hydrogen, thus constituting the hydrogen element of the battery.

This application is a division of my application designated as "Case J," and filed June 13, 1881, in which claims are made to other features of my invention. For the sake of convenience in distinguishing this among other inventions of mine in secondary batteries, I have denominated it as "Case J, Division A."

Having fully described my invention, what I claim as new, and desire to secure by Letters Patent, is—

The method of forming the plates of a secondary battery, consisting in forming receptacles for oxide of lead in its surface, then applying oxide of lead to the plate and within such receptacles, and afterward subjecting the oxide of lead to pressure.

In testimony whereof I have signed my name to this specification in the presence of two subscribing witnesses.

CHARLES F. BRUSH.

Witnesses:
LEVERETT L. LEGGETT,
ELBERT H. BAKER.